(12) United States Patent
Melzer et al.

(10) Patent No.: US 6,346,992 B2
(45) Date of Patent: Feb. 12, 2002

(54) DRIVE SYSTEM FOR A SCANNING OR RECORDING DEVICE FOR A REPRODUCTION APPLIANCE

(75) Inventors: Peter Melzer; Volker Haushahn, both of Kiel (DE)

(73) Assignee: Heidelberger Druckmaschinen AG, Munich ( * ) Notice: Subject to any disclaimer, the term of this patent is extended or adjusted under 35 U.S.C. 154(b) by 0 days.

(21) Appl. No.: 09/776,955

(22) Filed: Feb. 5, 2001

(30) Foreign Application Priority Data

Feb. 5, 2000 (DE) .......................... 100 05 192

(51) Int. Cl.[7] .............................................. G06K 15/00
(52) U.S. Cl. .......................................... 358/1.5; 358/1.1
(58) Field of Search ........................... 358/1.1, 1.2, 1.5, 358/1.8, 1.13, 1.18, 296, 300, 505, 513, 474, 475, 486, 488, 494, 497, 496, 299, 298; 250/235

(56) References Cited

U.S. PATENT DOCUMENTS 4,205,350 A * 5/1980 Gunning .................... 358/296
4,769,717 A * 9/1988 Okamoto .................... 358/1.5

FOREIGN PATENT DOCUMENTS

| DE | 30 32 459 A1 | 3/1981 |
| DE | 198 29 225 A1 | 2/1999 |
| DE | 199 06 651 A1 | 4/2000 |

* cited by examiner

Primary Examiner—Arthur G. Evans
(74) Attorney, Agent, or Firm—Herbert L. Lerner; Laurence A. Greenberg; Werner H. Stemer (57) ABSTRACT

A drive system for a carriage, which is fitted with a scanning or recording device, in a reproduction appliance, in which the scanning or recording device scans or exposes a recording material periodically along scanning or recording lines. The carriage is moved forward with the aid of a drive apparatus along a straight line at right angles to the scanning or recording lines. The drive apparatus contains an electric motor whose rotation speed is determined by a frequency of drive pulses that are produced by dividing a master clock by an integer factor. The drive apparatus contains an apparatus for converting a rotary movement of the electric motor into a linear movement of the carriage. Furthermore, the drive system contains a device by which an identical number of drive pulses can be lengthened or shortened by one or more periods of the master clock in each scanning or recording period.

11 Claims, 4 Drawing Sheets

DRIVE SYSTEM FOR A SCANNING OR RECORDING DEVICE FOR A REPRODUCTION APPLIANCE

BACKGROUND OF THE INVENTION

1. FIELD OF THE INVENTION

The invention relates to a drive system for a carriage, which is fitted with a scanning or recording device, in a reproduction appliance. In the reproduction appliance, the scanning or recording device scans an original or exposes a recording material periodically along scanning or recording lines. The carriage is moved forward with the aid of a drive apparatus along a straight line at right angles to the scanning or recording lines. The drive apparatus contains an electric motor whose rotation speed is determined by a frequency of drive pulses which are produced by dividing a master clock by an integer factor, and contains an apparatus for converting the rotary movement of the electric motor into a linear movement of the carriage.

One example of such a reproduction appliance is a so-called internal drum recorder or exposure unit for recording information on a recording material which is lying on the inside of a cylindrical trough. The recording is often made by a focused light beam that is aimed at the recording material from a rotating deflection device that is disposed on the imaginary axis of the cylindrical trough. While the deflection device is rotating quickly, it is moved in steps or continuously along the axis, so that the recording material is exposed along helical or circular lines, predominantly with raster-image motifs.

Another example of a reproduction appliance is an external drum scanner for optical scanning of an original which is disposed on the outside of a cylindrical drum, in order to digitize image information located on the original. In this example, the drum normally rotates, while an optoelectric scanning device is moved slowly parallel to the drum axis.

In reproduction appliances such as this, the carriage which is fitted with the scanning or recording device and is moved axially is driven, for example, by an axially running threaded spindle which is rotated by an electric motor, which is frequently a stepping motor. Other drives operate, for example, with a steel strip or a cable, or a linear motor is used. The frequency of the drive pulses for the stepping motor must be finely adjustable and must be kept very constant during the scanning or recording process since even very small position errors can adversely affect the recording or scanning quality.

Conventionally, the drive pulses are obtained from a high-frequency master clock which is divided in a divider by an integer factor which is chosen such that the speed of the resultant feed movement is as close as possible to a desired feed rate. In order to allow the frequency of the drive pulses to be adjusted finely, it is either necessary to use very high master clock frequencies in the Gigahertz band, which can be processed only by using logic circuits based on ECL technology, or synthesizers are required, with analog phase lock loop (PLL) chips which can divide both the integer and fractional parts.

These techniques require a relatively high level of complexity and, furthermore, are associated with problems. With Gigahertz technology, it is difficult to develop electromagnetically compatible circuits, and with synthesizers jitter and drift phenomena can easily occur, which must in turn be compensated for with a great deal of complexity in order to achieve the necessary frequency stability.

SUMMARY OF THE INVENTION

It is accordingly an object of the invention to provide a drive system for a scanning device or a recording device for a reproduction appliance which overcomes the above-mentioned disadvantages of the prior art devices of this general type, which, using comparatively simple devices, can produce a feed movement whose speed can be adjusted finely and can be kept highly constant.

With the foregoing and other objects in view there is provided, in accordance with the invention, a drive system for a carriage fitted with an apparatus being a scanning apparatus or a recording apparatus. The carriage is disposed in a reproduction appliance, and the apparatus performs one of scanning an original and exposing a recording material periodically along one of scanning lines and recording lines. The drive system contains a drive apparatus for moving the carriage forward along a straight line at right angles to one of the scanning lines and the recording lines. The drive apparatus includes an electric motor having a rotation speed determined by a frequency of drive pulses produced by dividing a master clock by an integer factor; an apparatus for converting a rotary movement of the electric motor into a linear movement of the carriage; and a device by which a duration of an identical number of the drive pulses can be changed by at least one period of the master clock in each operating period of the apparatus.

For a drive system according to the invention, the object is achieved by a device with which the number of drive pulses can be lengthened or shortened by one or more periods of the master clock in each scanning or recording period.

The technique of lengthening individual pulses, which have been obtained by integer subdivision from a master clock, by one or more periods of the master clock in order to adjust the frequency of the pulses very much more finely than the frequency interval between integer fractions of the master clock is known per se as "clock stealing" or a "binary fraction divider" technique. The invention also covers the action on the periodic master clock being synchronized to the scanning or recording period. This measure prevents the creation of interference frequencies in the drive pulses, which can lead to beating with machine frequencies or with the raster frequency which may, in turn, lead to visible and thus disturbing strip or Moire patterns.

According to the invention, the mean speed of the feed movement of the carriage at right angles to the scanning or recording lines can be adjusted very finely, even if the frequency of the master clock is not as high as would be necessary without "clock stealing". Specifically, in addition to the integer factor that is used for dividing the master clock, two further factors are available which can be varied in order to set the desired feed rate. These factors are the number of drive pulses in each scanning or recording period which are in each case lengthened or shortened by one or more periods of the master clock, and the number of periods of the master clock by which the respective drive pulses are lengthened or shortened in each scanning or recording period. Master clock frequencies of less than approximately 100 MHz are thus sufficient for practical applications. These are frequencies that can be produced and processed without any problems using simple digital techniques such as TTL technology.

The frequency of the master clock itself can always be kept constant for the invention since even the process of accelerating the electric motor at the start of a scanning or recording process can be controlled by suitably varying the factors which govern the feed rate. A constant-frequency master clock can be produced and kept constant considerably more easily than a variable frequency master clock, as has been required until now.

The synchronization of the lengthening or, alternatively, shortening of individual drive pulses with the scanning or recording period is achieved in that the feed distance from one scanning or recording line to the next is always the same. There are thus no density fluctuations in a scanned or recorded raster pattern, which can lead to visible strip or Moire patterns.

According to the basic solution of the invention, individual drive pulses in each scanning or recording period can either be lengthened or shortened. The first of these alternatives is preferable for practical implementation of the invention by commercially available electronic components. Specifically, in an embodiment such as this, individual drive pulses in each scanning or recording period are lengthened by one or more periods of the master clock by masking out the same number of periods of the master clock in each scanning or recording period, with the remaining periods being subdivided by the integer factor to form the drive pulses. In this case, the integer factor by which the master clock is divided is chosen such that the frequency of the drive pulses will be just above the target frequency without masking.

Alternatively, a circuit is also conceivable in which the drive pulses are shortened instead of being lengthened. In this case, the integer factor by which the master clock is divided is chosen such that the frequency of the drive pulses would be just below the target frequency, without shortening. In one preferred embodiment of the invention, the electric motor is a stepping motor. The use of a stepping motor has the advantage that its rotation angle is strictly proportional to the number of drive pulses. Furthermore, the stepping motor can be driven more or less directly using the drive pulses. A high-resolution operating mode for the stepping motor is preferable, with finely graduated intermediate currents, which allow particularly low-resonance running. In this operating mode, approximately sinusoidal phase currents are produced for the windings of the stepping motor, from the square-wave drive currents.

If a stepping motor is used as the electric motor, mechanical damping is also required. This is provided by a mass which is mounted such that it can rotate and whose moment of inertia is considerably greater than the moment of inertia of the other rotating parts of the drive apparatus, and which is rotationally coupled through a flexible coupling device to the other rotating parts of the drive apparatus. Since the action on the master clock is virtually the same in each scanning or recording period, the remaining interference can be sufficiently well damped by the flexibly coupled rotating mass, so that no resonances can appear. Furthermore, the frequency of the remaining interference is so far above the mechanical resonant frequencies of the reproduction appliance that it can be reliably stated that no mechanical oscillations will be excited.

The flexible coupling device is preferably a friction clutch, which is obtained in a simple manner by an annular friction lining which acts on a centrally mounted disk, which forms the mass which is mounted such that it can rotate. Thus, apart from its mechanically simple construction, a friction clutch like this has the advantage of a uniform braking torque irrespective of the rotation speed, so that the oscillation-damping effect of the disk is available throughout the entire rotation speed range, that is to say for any desired scanning or recording frequency.

In principle, apart from friction clutches, other types of coupling are feasible which allow relative movement between the disk and the rest of the system, for example hydrodynamic couplings, in which case the rotating mass can be formed by the flow medium itself, ferrofluid couplings or rubber couplings. However, with the fundamentally possible alternatives to a friction clutch, it may be difficult to achieve uniform oscillation damping which is largely independent of the rotation speed.

A regulated DC motor can be used as the electric motor, as an alternative to the stepping motor. In this case, a rotation angle sensor is also required, whose measurement pulses are supplied to a control circuit which ensures that each drive pulse produces a constant rotation angle of the DC motor. Specifically, a clock disk is located on the shaft of the DC motor as the rotation angle sensor, from which disk a sensor is used to derive a clock whose frequency is proportional to the actual rotation speed of the motor. The drive pulses produced according to the invention are at a frequency that is proportional to the nominal rotation speed of the motor. A phase comparator is used to compare the two frequencies, using normal control techniques, with a control variable being obtained from this, for readjustment of the motor. No mechanical damping is required for such a DC drive.

The invention is suitable, for example, for internal drum reproduction appliances, for example internal drum recorders or internal drum scanners, in which the recording material or the original is disposed cylindrically and is exposed or scanned line-by-line by a rapidly rotating light deflection device, with the light deflection device being moved slowly along the cylinder axis.

The invention is also suitable for other reproduction appliances, for example those in which, rather than the deflection device or a corresponding part of a scanning or recording device, this is done by rotating rapidly a drum on whose inside or outside the original or the recording material is located, with either the scanning or recording device or the drum being moved slowly forward axially by the electric motor.

Furthermore, the invention is suitable for all reproduction appliances in which a slow and a rapid relative movement take place between the scanning or recording device and the original or the recording material, with the rapid relative movement normally being at right angles to the slow relative movement. In all these apparatuses, the linking between the two axes according to the invention is feasible, namely the link between the scanning or recording line (rapid relative movement) and the feed direction (slow relative movement) in order to achieve the described advantages.

Therefore, the invention is not limited to internal or external drum recorders or exposure units, but is also suitable for those recorders or exposure units in which the original or the recording material is not disposed cylindrically, or is disposed cylindrically only in places. These include, for example, flat-bed or capstan exposure units or recorders. In exposure units such as these, a film to be exposed is stretched over a flat table, or is moved slowly over a drum. The light beam used for exposure is preferably deflected by a rapidly rotating polygonal mirror or by an oscillating mirror transversely with respect to the feed of the table or of the drum, and is imaged via an objective on the film. Capstan exposure units can be used to expose film strips of "any desired" length.

In accordance with an added feature of the invention, the integer factor, a number of the drive pulses in the operating period, and a number of periods of the master clock by which a duration of the operating period is changed, are chosen such that a mean speed of a resultant feed movement is as close as possible to a desired feed rate.

In accordance with an additional feature of the invention, the master clock has a frequency of 100 MHz or less and the frequency of the master clock is constant.

In accordance with another feature of the invention, an identical number of the periods of the master clock are masked out in the operating period, with remaining ones of the periods of the master clock being subdivided by the integer factor to produce the drive pulses.

In accordance with a further feature of the invention, the electric motor is a stepping motor, and the drive apparatus has a flexible coupling device, a mass, and further rotating parts with a moment of inertia. The mass is mounted such that it can rotate and whose moment of inertia is considerably greater than the moment of inertia of the further rotating parts of the drive apparatus, and the mass is rotationally coupled through the flexible coupling device to the further rotating parts.

In accordance with another added feature of the invention, the flexible coupling device is a friction clutch and the friction clutch contains an annular friction lining acting on the mass. In addition, the friction clutch has a universal-joint attachment for pressing the friction lining.

In accordance with another additional feature of the invention, the electric motor is a DC motor. A rotation-angle sensor is provided for sensing a rotation angle of the DC motor, and a control circuit for controlling a rotation speed of the DC motor is provided.

In accordance with a concomitant feature of the invention, the reproduction appliance is an internal drum, an external drum, a flat bed or a capstan type.

Other features which are considered as characteristic for the invention are set forth in the appended claims.

Although the invention is illustrated and described herein as embodied in a drive system for a scanning device and a recording device for a reproduction appliance, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
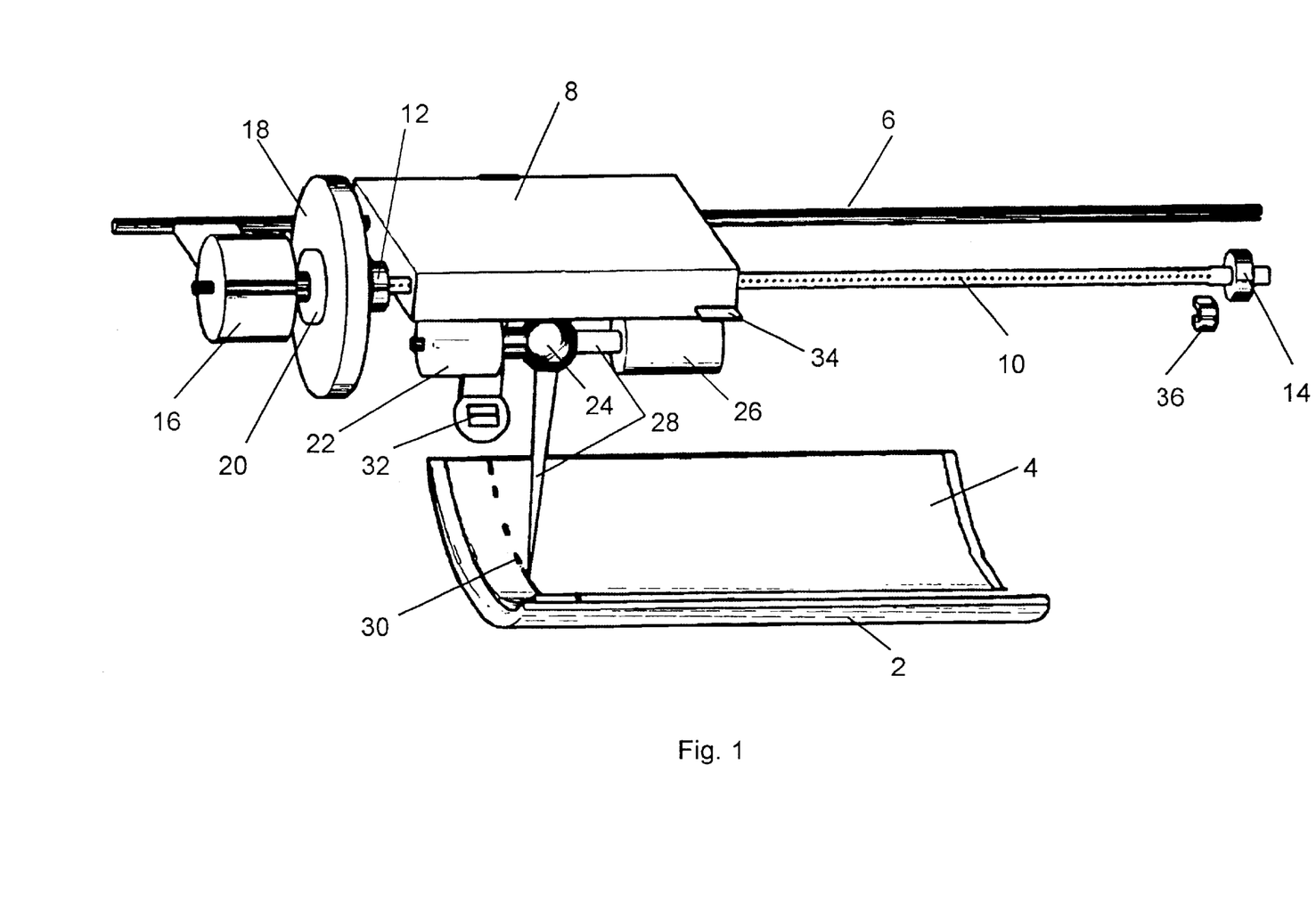
FIG. 1 is a diagrammatic, perspective view of an internal drum recorder having a damping device that is coupled to a threaded spindle according to the invention.

In all the figures of the drawing, sub-features and integral parts that correspond to one another bear the same reference symbol in each case. Referring now to the figures of the drawing in detail and first, particularly, to FIG. 1 thereof, there is shown an internal drum recorder that contains a cylindrical trough 2 which is fitted on its inside with a recording material 4 which, in this example, is a photosensitive material. Elongated guide rails 6 extend above the cylindrical trough 2, although only one of them is shown in FIG. 1, parallel to an axis of the cylindrical trough 2. A transport carriage 8 is carried on the guide rails 6 so that it can be moved over the entire length of the cylindrical trough 2, and parallel to the axis of the cylindrical trough 2.

A non-illustrated split nut, or some other engagement device on the transport carriage 8, engages in a spindle 10, which extends parallel to the axis of the cylindrical trough 2 and over its entire length, and which is mounted in bearings 12 and 14 at both of its ends, such that it can rotate. The spindle 10 is provided with a thread between the bearings 12 and 14. One end of the spindle 10 extends beyond the bearing 12 as far as a stepping motor 16, to whose drive shaft the spindle 10 is firmly connected. A housing of the stepping motor 16 is firmly attached to the internal drum recorder, in the example on the guide rail 6. The spindle 10 and the split nut form an apparatus for converting the rotary movement of the stepping motor 16 into a linear movement of the transport carriage 8.

A rotationally symmetrical mass in the form of a disk 18 is mounted, such that it can rotate, on the section of the spindle 10 between the stepping motor 16 and the bearing 12. A friction clutch 20 acts on one flat face of the disk 18, to drive it, and is coupled to the spindle 10. The disk 18 and the friction clutch 20 form a damping device, whose construction and operation will be explained in more detail later.

The transport carriage 8 is fitted with an electric motor 22 to whose drive shaft a 900 light deflection device 24 is attached, and the transport carriage 8 is also fitted with a light source 26. The electric motor 22, the 90° light deflection device 24 and the light source 26 are disposed successively along the axis of the cylindrical trough 2. The light source 26 aims a light beam 28 from the light source 26 along the axis of the cylindrical trough 2 at the light deflection device 24 which is, for example, a mirror or a prism. The light deflection device 24 turns the light beam 28 at right angles to the axis into the cylindrical trough 2. The light beam 28 is focused such that its focus lies approximately on the surface of the recording material 4.

In operation, the light deflection device 24 is rotated rapidly by the electric motor 22, so that the light beam 28 moves repeatedly over the recording material 4. The light beam 28 can be switched on and off very rapidly by a light modulator in the light source 26, in order to expose the recording material 4 with a desired pattern along a circular recording line 30, as is indicated by the dashes on the recording line 30.

While the light deflection device 24 is rotating rapidly, the transport carriage 8 is moved slowly along the axis of the cylindrical trough 2 in order to expose the recording material 4 line-by-line, with the focused light beam 28 describing helical lines on the recording medium 4.

A difference diode 32, which records the light beam 28 as it passes over the difference diode 32, is used to control a starting time for the exposure of each line. A reference mark 34 on the transport carriage 8 and a position detector 36 which is fixed to the machine and, for example, in this case contains a fork light barrier, provide a reference position for the transport carriage 8.

At the start of the exposure process, the transport carriage 8 is located at one end of the spindle 10 in a reference position that is defined by the position detector 36 and the reference mark 34. The electric motor 22 is accelerated to a constant rotation speed and, as soon as the desired rotation speed is reached, the transport carriage 8 is moved at a constant speed. While the transport carriage 8 is being moved at a constant speed, the recording material 4 is exposed by the light beam 28, frequently with raster-image motifs.

The rotation speed of the electric motor 22, and thus of the light deflection device 24, remains at a preset value during the exposure process, and this value is constant to approximately 10 parts per million (ppm).

The feed rate of the transport carriage 8 must likewise be kept very constant. In particular, it is necessary to maintain the number of exposed lines for a given movement distance of the transport carriage 8 to an accuracy of better than 50 ppm. Therefore, the frequency of the drive pulses for the stepping motor 16 may vary by not more than 50 ppm.

For reasons that will be explained in more detail later, the feed rate of the transport carriage 8 should also be adjustable in very fine steps, which are considerably less than 50 ppm of the feed rate.

Figure 2:
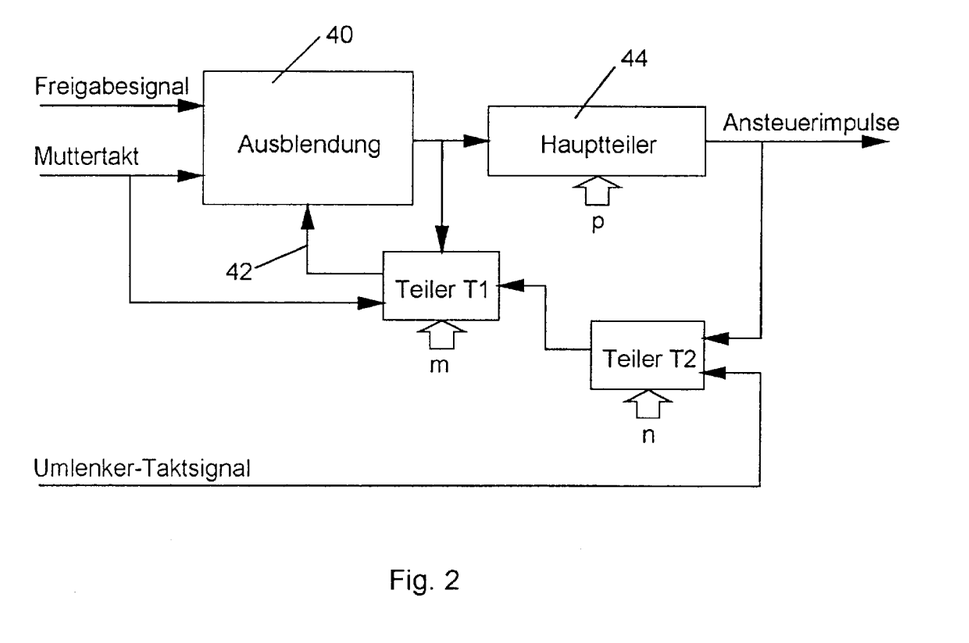
FIG. 2 is a block diagram of a circuit for producing variable-frequency drive pulses from a constant master clock.

An electronic circuit, which is shown in the form of a block diagram in FIG. 2, is used to produce drive pulses for the stepping motor 16, whose frequency can not only be kept appropriately constant but can also be varied appropriately finely.

The circuit shown in FIG. 2 contains a masking section 40, to which a master clock composed of square-wave pulses at a constant frequency M, an enable signal and a masking signal 42 are supplied. An output signal from the masking section 40, which is supplied to a main divider 44, corresponds to the master clock when the masking is not enabled. When the masking is enabled, an output signal from the masking section 40 corresponds to the master clock in which individual periods are masked out, as defined by the masking signal 42.

A main divider 44 divides the pulse train supplied from the masking section 40 by an integer factor p in order to produce drive pulses for the stepping motor 16 (FIG. 1). The drive pulses are then supplied to a divider T2, which is reset and restarted by a deflection device clock signal. The deflection device clock signal is at a frequency U and has a period that corresponds to a duration of one revolution of the light deflection device 24, that is to say the recording period. A parameter n which is loaded in the divider T2 determines the number of stepping motor steps per revolution of the light deflection device 24 for which the clock will be masked out.

The output signal from the divider T2 is supplied to a divider T1, which also receives the output signal from the masking section 40 and the master clock M. A parameter m that is loaded in the divider T1 determines how many square-wave pulses of the masking clock M will actually be masked out per stepping motor step in which the clock is actually intended to be masked out. The output signal from the divider T1 forms the masking signal 42 that is supplied to the masking section 40. The parameters n and m are integer numbers greater than or equal to 1.

Practical values for the various frequencies are as follows: the master clock that is produced by an oscillating crystal typically has a frequency M of approximately 60 MHz. The frequency U of the deflection device clock signal, that is to say the revolution frequency of the light beam 28 which is diverted by the light deflection device 24 in the trough 2 is typically approximately 500 Hz. The drive pulses for the stepping motor 16 are typically at a frequency S in the range from approximately 10 to 200 kHz, depending on the desired resolution of the motif to be recorded on the recording material 4.

Figure 3:
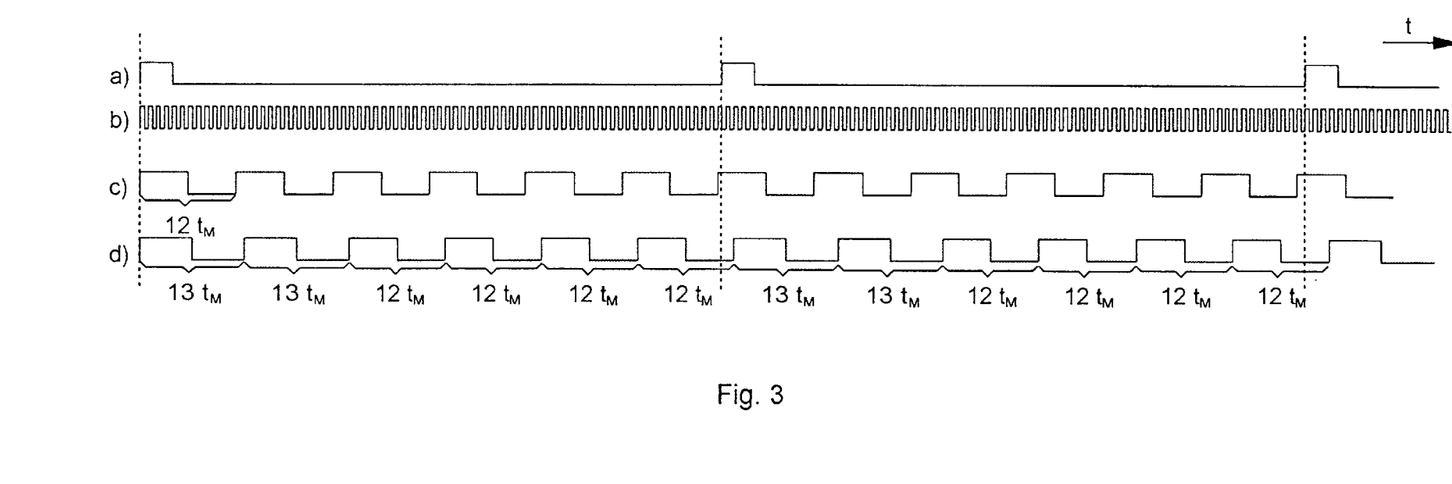
FIG. 3 is a pulse diagram of input and output pulse trains of the circuit shown in FIG. 2, in order to explain the operating principle of the circuit.

To make it easier to show the various frequencies in pulse diagrams, an example is used as the basis in which the frequencies are considerably closer to one another than is the case in practice. FIG. 3 shows synchronized pulse diagrams for this example.

The pulse train a) in FIG. 3 shows somewhat more than two periods of the deflection device clock signal. 72.5 master clock periods of the constant master clock produced asynchronously in this case (pulse train b) in FIG. 3 fit into one divert period. In the example in FIG. 3, the master clock and the deflection device clock signal are asynchronous, but they may also be synchronous, that is to say the deflection device clock signal is produced such that it is dependent on the master clock.

The pulse train c) shows an example for drive pulses for the stepping motor 16 when none of the individual periods of the master clock are masked out in the masking section 40. The factor p that is loaded in the main divider 44 is chosen such that the frequency of the drive pulses for the stepping motor 16 without masking is slightly above the frequency which is required for the desired resolution. In this example, the value of the factor p is 12, so that each drive pulse is precisely twelve master clock periods $t_M$ long. Accordingly, one period of the deflection device clock signal in this case has a length of 6.042 stepping motor steps.

Let us assume that masking is now enabled and that the parameters n and m have been chosen as follows: n=2 and m=1. In this case, the dividers T1 and T2 ensure that the drive pulses emitted from the main divider 44 for the stepping motor 16 are in a form as is shown in pulse train d) in FIG. 3. In particular, the first two drive pulses for the stepping motor within the deflection device period are each lengthened by one master clock period $t_M$, that is to say they are each thirteen master clock periods $t_M$ long, while the next four drive pulses in a period of the deflection device clock signal still have a length of twelve master clock periods $t_M$. This is repeated in each subsequent period of the deflection device clock signal. Accordingly, one period of the deflection device clock signal now contains 5.875 stepping motor steps.

Drive pulses for the stepping motor 16 can thus be produced at various frequencies S by varying the two parameters n and m (and for greater frequency changes by varying the parameter p). The maximum fineness of the frequency graduation corresponds to the ratio of the frequency U of the deflection device clock signal to the frequency M of the master clock, namely U/M. With the practical frequency values mentioned further above, U/M= 5000/60,000,000=8.33 ppm, which is considerably less than the required 50 ppm.

As can be seen from FIG. 3, the drive pulses for the stepping motor 16 are coupled to the deflection device clock signal. The "clock stealing" is in each case within the shortest possible time unit, the deflection device period, and is thus synchronous to the deflection device period.

The correction factor per period of the deflection device clock signal (deflection device period) is:

$$1-(U/M\times(n\times m)),$$

where n×m is the total number of master clock periods masked out within one period of the deflection device clock signal. The number of stepping motor steps per deflection device period is thus given by:

without masking: M/U/p (p=division parameter of the main divider 44) and, with masking: M/U/p×(1−(U/M×(n×m))).

The frequency S of the drive pulses for the stepping motor 16 (stepping motor frequency) is given by:

without masking: M/p, and with masking: M/p×(1−(U/M×(n×m))).

As can be seen, a moderate frequency M of the master clock is sufficient to allow the frequency S of the drive pulses for the stepping motor 16 to be adjusted in very fine steps by the two parameters n and m. In practice, a master clock frequency M of less than 100 MHz is sufficient, so that the circuit in FIG. 2 can be constructed from standard TTL components. The master clock itself can be produced at a constant frequency by a crystal oscillation circuit.

The feed rate of the transport carriage 8 can be adjusted very finely in the described manner, and it is possible to achieve position errors of the transport carriage 8 of less than approximately 100 nm. In order to achieve this with normal spindle pitches, a stepping motor 16 must be used which requires, for example, 10,000 drive pulses for one revolution, and the stepping motor 16 must have internal, mechanical, periodic positioning errors of only small amplitudes (less than the 3 angular minutes).

Such a stepping motor resolution can be achieved by in each case applying a "staircase" control current, which is approximately a sine-wave function, to the windings of the stepping motor 16 and is composed of individual pulses of equal length whose length in each case corresponds to the length of one drive pulse. Therefore, the control voltages are produced within the output stage for the stepping motor 16 from the drive pulses described above by travelling a constant distance on the x-axis of a preprogrammed sine-wave function for each drive pulse, and reading the associated y-value. The voltages which are read are amplified in an analog output stage, which forms the power source for the stepping motor 16, and are supplied to the windings of the stepping motor 16.

During the production of the drive pulses for the stepping motor 16 as described above, the frequency set by variation of the parameters n and m is only a mean frequency. Within one deflection device period, there are small sudden changes in frequency or period of one or more master clock periods. These lead to sudden periodic speed changes in the feed rate of the transport carriage 8. Intrinsically, these have no adverse effect on the exposure quality, provided the sudden changes are very small and are also the same in each deflection device period. However, they may be sufficient to excite mechanical resonance in the stepping motor and/or in the other rotating components for the feed mechanism of the transport carriage 8.

The described sinusoidal operation of the stepping motor 16 with analog intermediate currents admittedly itself ensures relatively low-resonance running of the stepping motor 16 and reliable suppression of any resonances in the overall rotating system, that is to say the resonance amplitude does not exceed the internal positioning error, but mechanical damping is required.

Figure 4:
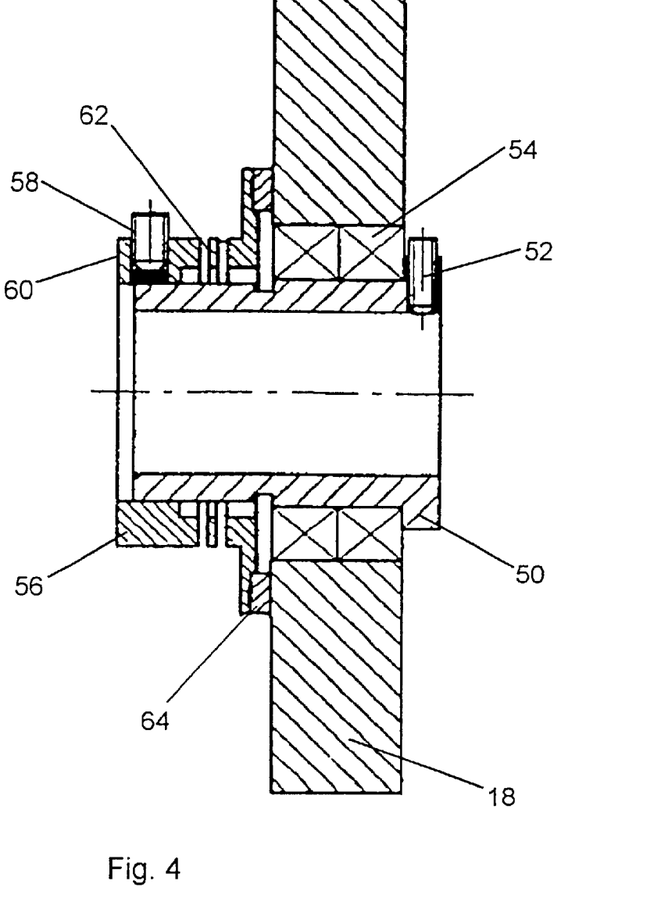
FIG. 4 is an axial sectional view of the damping device shown in FIG. 1.

The mechanical damping is produced by the damping device composed of the disk 18 and the friction clutch 20 (FIG. 1), and which is illustrated in detail in FIG. 4. A cylindrical bush 50, which is rigidly connected to the spindle 10 (FIG. 1) by a setscrew 52, is seated centrally on the spindle 10 (not shown in FIG. 4). Annular bearings 54 with as little friction as possible, for example ball bearings, are seated on the bush 50. The bearings 54 hold and guide the solid disk 18 centrally on the bush 50, so that the disk 18 can rotate about the bush 50, and thus about the spindle 10. The disk 18 is configured such that its moment of inertia is considerably greater than the total moment of inertia of a rotor of the stepping motor 16 and of the spindle 10, for example being seven times greater.

A plate spring 56 is also seated on the bush 50 and is connected by a screw 58 to the bush 50 such that they rotate together, with a small pressure plate 60 preventing any mechanical deformation of the bush 50 during tightening of the screw 58. A sprung section 62 of the plate spring 56 presses an annular friction lining 64 against one end face of the disk 18. The sprung section 62 of the plate spring 56 contains a number of axially offset slots in the plate spring 56, with axially adjacent slots further more being radially offset through 900 with respect to one another. Therefore, the friction lining 64 is universally jointed and presses against the disk 18 with a defined axial force.

The universally-jointed attachment of the friction lining 64 results, first, in that the latter is connected to the bush 50 such that they are stiff in rotation and, second, that the friction lining 64 can change its angle to a slight extent, so that the friction force exerted on the disk 18 is always the same, even if there are any inaccuracies resulting from manufacture. This results in a uniform braking torque between the bush 50 and the disk 18 when they rotate relative to one another.

Therefore, the disk 18 is driven by the spindle 10 when the latter rotates, but with the rotation of the disk lagging behind the rotation of the spindle 10 or leading it when the rotation speed of the spindle 10 varies relatively quickly.

The configuration described above is configured such that the braking torque which occurs during any relative movement between the bush 50 and the disk 18 is sufficiently small that, in practice, it no longer need be considered when analyzing the torque of the rotating system.

In consequence, there is virtually no load from the disk 18 on the stepping motor 16 once the operating rotation speed has been reached and the rotation speed of the disk 18 has been matched to that of the stepping motor 16. Therefore, any change in the rotation speed of the stepping motor 16 which is caused by the drive pulses of different length in a deflection device period leads to a differential movement between the friction lining 64 and the disk 18, since the moment of inertia of the disk 18 is considerably greater than the moment of inertia of the rest of the rotating system. The friction between the friction lining 64 and the disk 18 prevents the amplitudes of any mechanical oscillations being able to build up in a manner which cannot be calculated. This gives the drive system a smooth running characteristic that is suitable for practical applications.

The disk 18 and the rest of the rotating system actually never run at the same rotation speed. The high-inertia disk 18 of the damping device rotates at the correct rotation speed, while the rest of the rotating system carries out relatively high-frequency rotational oscillations.

The braking torque that acts between the spindle 10 and the disk 18 during the continuous relative movements is made to be sufficiently large that any mechanical excitation due to the rotation-speed fluctuations of the stepping motor 16 as a result of the periodic action on the master clock and for amplitudes of less than 2% is so heavily damped that no further amplitude increase takes place.

The following estimation process can be used to define the size and mass of the disk 18, which govern its moment of inertia. A natural frequency which the system containing the rotor of the stepping motor 16, the spindle 10 and the disk 18 would have if the spindle 10 and the disk 18 were rigidly connected to one another. That is to say if the disk 18 were a flywheel disk, must be considerably less than the natural frequencies which actually occur in the drive system. Specifically, these are as follows: 1) resonant frequencies of the rotor and spindle, 2) resonant frequencies arising from rotating-field errors in the stepping motor 16, and 3) resonant frequencies arising from the pulsed control of the stepping motor 16.

As mentioned, the described "clock stealing" takes place in synchronism with the deflection device clock signal. This reliably avoids any density fluctuations appearing on the recording material which is exposed in the internal drum recorder.

Figure 5A:
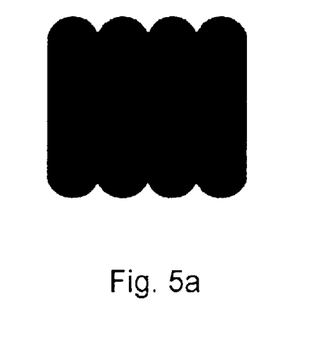
FIG. 5a is an example of a pixel which was produced by the internal drum recorder in FIG. 1.
Figure 5B:
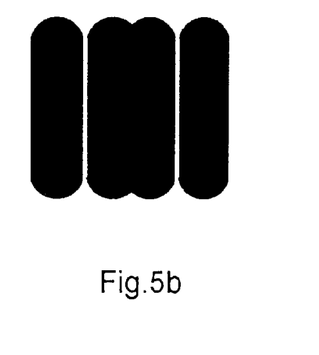
FIG. 5b is an example of a pixel that was produced using a conventional internal drum recorder without the two axes being synchronized, in which case the type of distortion varies from pixel to pixel.

This is illustrated in FIGS. 5*a* and b, which each show a rectangular pixel which has been exposed during four revolutions of the light deflection device 24, so that it extends over four lines or recording lines. FIG. 5*a* shows such a pixel that is produced when the "clock stealing" occurs in synchronism with the deflection device clock signal, that is to say within the shortest possible time unit, and FIG. 5*b* shows a pixel which would be produced if the "clock stealing" were to take place within any other time unit. In FIG. 5*a*, the interval between the recording lines is precisely the same while, in FIG. 5*b*, there are significant density fluctuations when the error varies from pixel to pixel. These density fluctuations can admittedly not be seen with the naked eye on the reproduced product, but are repeated after a number of deflection device periods. An observer would thus see strip or Moiré patterns on the reproduced product if the "clock stealing" were not synchronized to the deflection device period.

A person skilled in the art is aware that there is no need to be concerned about the number of lines per raster point if the action on the continuous master clock is synchronized to the revolution period of the light deflection device 24, that is to say it is carried out within the shortest possible time unit, since this action is virtually the same in each recording line. Furthermore, the masking timing of the "clock stealing" is at such a high frequency that no beating with machine system frequencies occurs.

The described method of obtaining a desired drive frequency for the stepping motor 16 by lengthening the same number of drive pulses by one or more periods of the master clock in each scanning or recording period can furthermore be used in order to vary the drive frequency for the stepping motor 16 in fine steps during the recording process. This makes it possible to compensate for spindle discrepancies resulting from production. For this purpose, the spindle is accurately measured, and the spindle discrepancy, for example discrepancies in the spindle pitch from the nominal value, are stored in a table. The values stored in this table are used to vary the drive frequency of the stepping motor 16 during the recording process in steps which are fine enough to allow "clock stealing", so that spindle discrepancies are just compensated for. Therefore, the resultant feed rate of the transport carriage 8 remains constant despite the spindle discrepancies. There is thus no need for high-precision spindles, which are expensive to produce, in order to achieve high reproduction quality, and a normal spindle, which is subject to certain discrepancies, is sufficient.

A regulated DC motor can be used as the electric motor 16. In this case, a rotation angle sensor 100 is required, whose measurement pulses are supplied to a control circuit 101 which ensures that each drive pulse produces a constant rotation angle of the DC motor 16. The rotation angle sensor 100 and the control circuit 101 are shown by dashed lines in FIG. 1 as an alternative embodiment. Specifically, a clock disk is located on a shaft of the DC motor 16 as the rotation angle sensor 100, from which a clock whose frequency is proportional to the actual rotation speed of the motor is derived. The drive pulses produced are at a frequency that is proportional to a nominal rotation speed of the motor 16. A phase comparator is used to compare the two frequencies, using normal control techniques, with a control variable being obtained from this, for readjustment of the motor. No mechanical damping is required for the DC motor 16. In FIG. 1, the control circuit 101 is shown as integrated in the DC motor 16 but could also be a stand alone component.

We claim:

1. A drive system for a carriage fitted with an apparatus selected from the group consisting of a scanning apparatus and a recording apparatus, the carriage is disposed in a reproduction appliance, and the apparatus performs one of scanning an original and exposing a recording material periodically along one of scanning lines and recording lines, the drive system comprising:

a drive apparatus for moving the carriage forward along a straight line at right angles to one of the scanning lines and the recording lines, said drive apparatus containing:
an electric motor having a rotation speed determined by a frequency of drive pulses produced by dividing a master clock by an integer factor;
an apparatus for converting a rotary movement of said electric motor into a linear movement of the carriage; and
a device by which a duration of an identical number of the drive pulses can be changed by at least one period of the master clock in each operating period of the apparatus.

2. The drive system according to claim 1, wherein the integer factor, a number of the drive pulses in the operating period, and a number of periods of the master clock by which a duration of the operating period is changed, are chosen such that a mean speed of a resultant feed movement is as close as possible to a desired feed rate.

3. The drive system according to claim 1, wherein the master clock has a frequency of 100 MHz or less.

4. The drive system according to claim 1, wherein the frequency of the master clock is constant.

5. The drive system according to claim 1, wherein an identical number of the periods of the master clock are masked out in the operating period, with remaining ones of the periods of the master clock being subdivided by the integer factor to produce the drive pulses.

6. The drive system according to claim 1, wherein:
said electric motor is a stepping motor; and
said drive apparatus has a flexible coupling device, a mass, and further rotating parts with a moment of inertia, said mass mounted such that it can rotate and whose moment of inertia is considerably greater than the moment of inertia of said further rotating parts of said drive apparatus, and said mass is rotationally coupled through said flexible coupling device to said further rotating parts.

7. The drive system according to claim 6, wherein said flexible coupling device is a friction clutch.

8. The drive system according to claim 7, wherein said friction clutch contains an annular friction lining acting on said mass.

9. The drive system according to claim 8, wherein said friction clutch has a universal-joint attachment for pressing said friction lining.

10. The drive system according to claim 1,
wherein said electric motor is a DC motor;
including a rotation-angle sensor for sensing a rotation angle of said DC motor; and
including a control circuit for controlling a rotation speed of said DC motor.

11. The drive system according to claim 1, wherein the reproduction appliance is selected from the group consisting of internal drums, external drums, flat beds and capstan types.

* * * * *